UNITED STATES PATENT OFFICE.

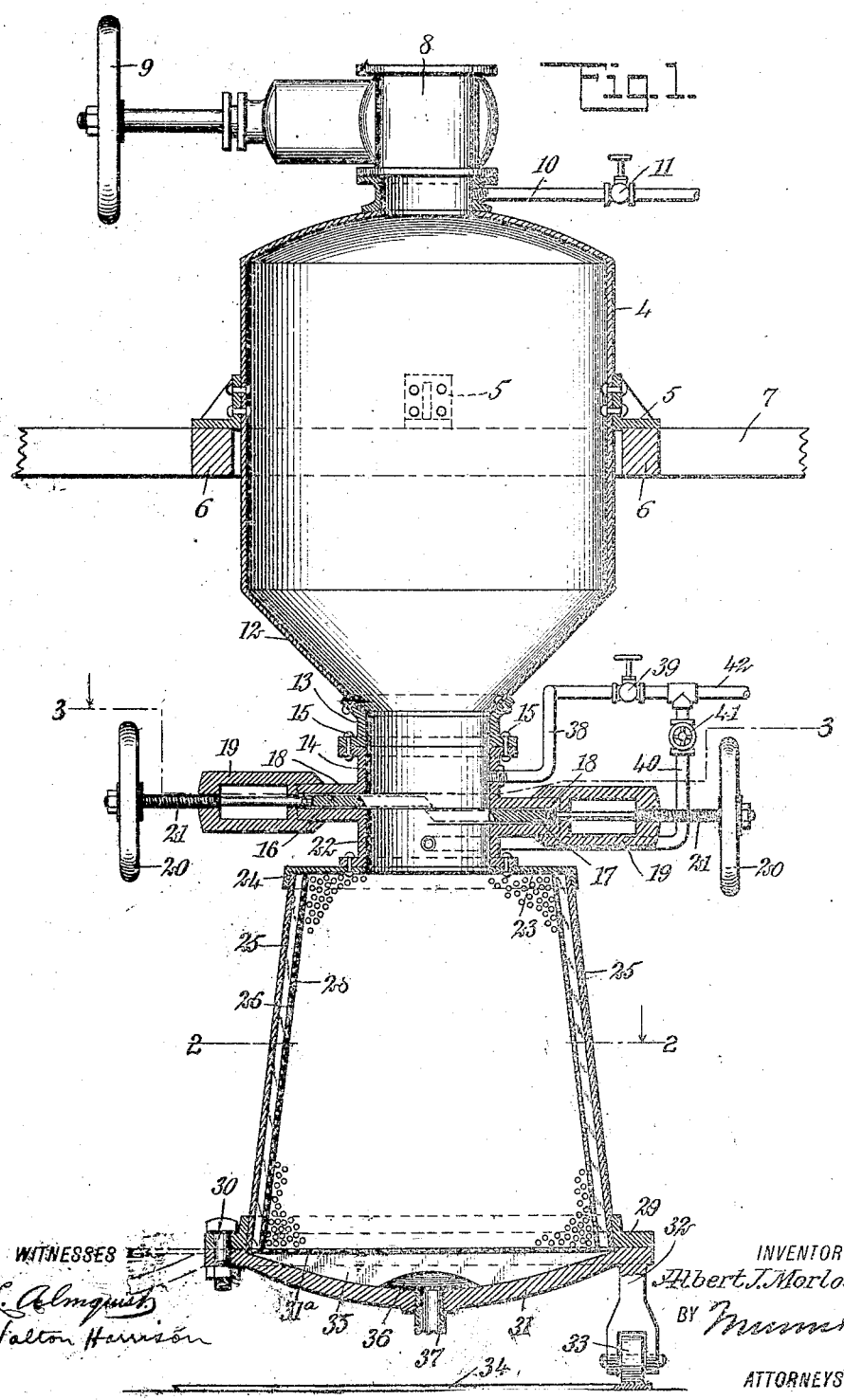

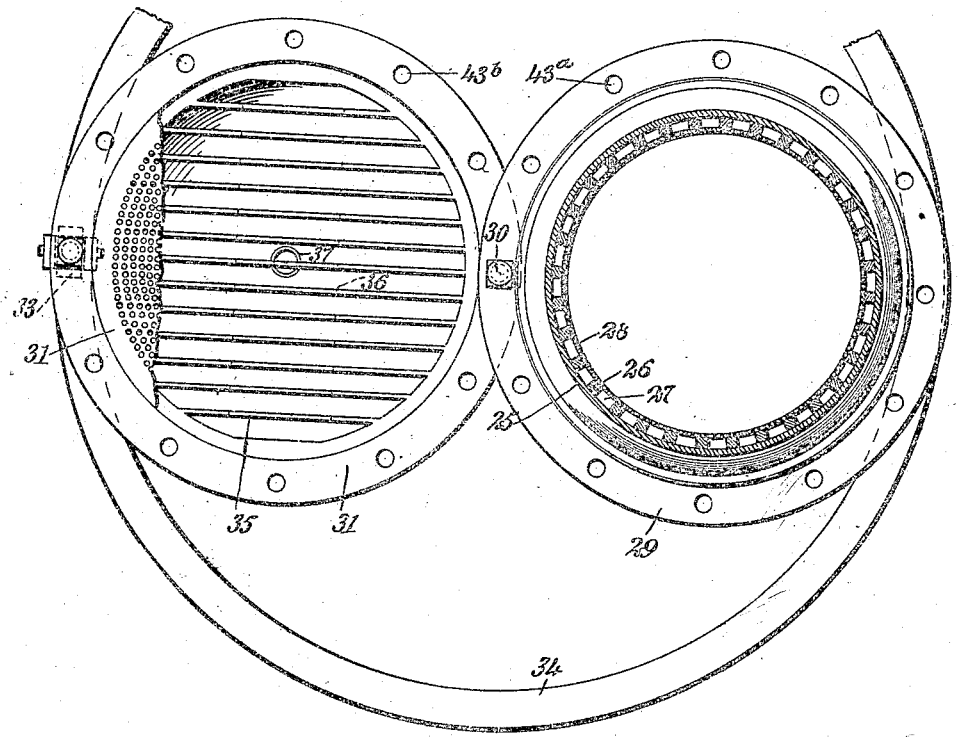
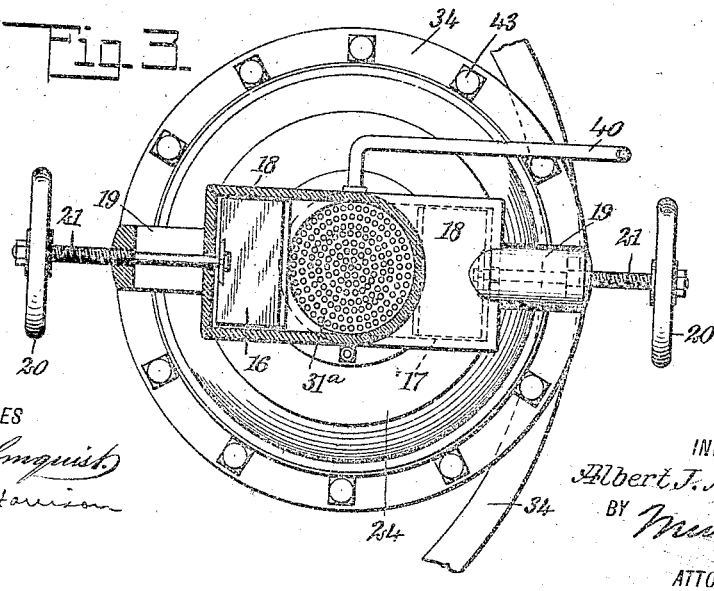

ALBERT J. MORLOCK, OF NEW YORK, N. Y.

SEPARATOR.

No. 931,457.

Specification of Letters Patent.

Patented Aug. 17, 1909.

Application filed March 17, 1909. Serial No. 484,014.

*To all whom it may concern:*

Be it known that I, ALBERT J. MORLOCK, a citizen of the United States, and a resident of the city of New York, borough of Brooklyn, in the county of Kings and State of New York, have invented a new and Improved Separator, of which the following is a full, clear, and exact description.

My invention relates to separators, my more particular purpose being to provide an efficient mechanism for separating fish oils and other fluid substances from fish refuse, by aid of steam pressure applied directly to the raw materials operated upon, in such manner as to express the oils and other liquids continuously and to render them easily removable.

My invention further relates to means for using conjointly the heat of steam and the tension or pressure thereof in extracting the oils and other liquids.

My invention still further relates to various mechanical details for improving generally the action of separators.

Reference is to be had to the accompanying drawings forming a part of this specification, in which similar characters of reference indicate corresponding parts in all the figures.

Figure 1 is a substantially central vertical section through the separator complete, showing the upper and lower receptacles, valve mechanism therebetween, and showing in the lower receptacle the straining mechanism through which the oils and other liquids are forced by pressure of steam or other aeriform body; Fig. 2 is a horizontal section upon the line 2—2 of Fig. 1, looking in the direction of the arrow, and showing the swinging door for ejecting the residual material, this door carrying a part of the straining mechanism; and Fig. 3 is a substantially horizontal section upon the line 3—3 of Fig. 1, looking in the direction of the arrow, and showing more particularly the mechanism for controlling communication between the upper and lower receptacles.

At 4 is a vessel which I designate as the upper receptacle. It is supported by lugs 5 which rest upon cross beams 6, the latter being mounted upon supporting beams 7.

At 8 is a valve provided with and controllable by a hand wheel 9 for the purpose of admitting the raw materials into the upper receptacle, and of closing this receptacle after the materials are in.

At 10 is a pipe provided with a valve 11 and used for admitting an aeriform body, preferably steam, into the upper receptacle. Compressed air, which may be heated if desired, may be employed instead of steam.

The upper receptacle 4 is provided with a conical portion 12 and mounted upon the latter is a collar 13. This collar is connected with a pipe section 14 by aid of bolts 15. Valve gates are shown at 16, 17 and are slidably mounted in housings 18. Mounted upon the housings are spiders 19 through which extend revoluble threaded stems 21 which are provided with hand wheels 20.

The operator, by turning the hand wheels 20, can bring the valve gates 16, 17 into close proximity, as indicated by dotted lines in Fig. 1, thus closing the valve, or may move them apart, as indicated by full lines in Fig. 1, thereby opening the valve. Connected with the housings 18 is a pipe section 22 and secured upon the latter is a plate 23 of metal provided with a downwardly cupped edge 24. Connected securely with this cupped edge and thus depending from the plate 23 is a conical shell 25 having its greatest diameter at the bottom. A number of spacing rods 26 are disposed around inside of the shell 25 and separated by spaces 27, as will be understood from Fig. 2.

A perforated metallic screen 28, having generally the form of a truncated cone, is disposed within the shell 25 and concentric thereto, this screen engaging the spacing rods 26 and holding the latter in position, as will be understood from Fig. 2. Encircling the lower end of the shell 25 and secured firmly upon it is a massive collar 29. A king bolt 30 extends downwardly through this collar as will be understood from Fig. 1, and partially supports a swinging door 31. This door has generally the form of a spherical segment and is partially supported by a caster 32 of which a roller 33 forms a part. This roller rests upon a circular track 34 and sustains at times a considerable portion of the weight of the door 31 and such materials as may be resting thereupon.

Integral with the door 31 and extending upwardly therefrom are a number of ribs 35 having generally the form indicated in Fig. 2. These ribs are severally provided with mutilations 36 for facilitating the flow of oil or other liquids, and these mutilations are disposed in alinement with an outlet pipe 37 through which the oils and other liquids are to be drawn.

At 31ᵃ is a screen of perforated metal having generally the form of a disk and carried by the door 31, being thus movable relatively to the conical screen 28. At 38 is a pipe which is tapped into the pipe section 14 just above the valve gate 17. This pipe 38 is provided with a hand valve 39 for opening and closing it. Another pipe 40 is provided with a hand valve 41 and is tapped into the pipe section 22. Both of the pipes 38, 40 are connected with a pipe 42 through which steam or compressed air may be supplied for purposes hereinafter described.

A number of supporting bolts 43 are used for securing the door 31 firmly to the collar 29 in instances where the pressure to be supplied within the apparatus is great. For this purpose the collar 29 and the outer portion of the door 31 are provided with holes 43ᵃ, 43ᵇ for accommodating the supporting bolts 43.

The operation of my device is as follows: Suppose that it be desired to extract fish oil from a heterogeneous mass of fish refuse. The hand wheels 20 are turned so as to open the two valve gates associated with them, thereby affording free communication between the upper and lower receptacles. The valve 8 is next opened by aid of the hand wheel 9. The raw materials are now fed through the valve 8 and fill the two receptacles and the neck connecting them together. The valve 8 is now closed and steam is admitted through the pipe 10 by aid of the hand valve 11. The first effect of admitting the steam is to slightly chill the same, causing, perhaps, a little condensation to take place. The free ingress of the steam causes a pressure to be applied to the upper surface of the mass of materials. The outlet pipe 37 at the bottom is left open, and the tendency of the steam under pressure is to force the materials downwardly and also outwardly through the screens 28 and 31ᵃ. Since, however, the perforations of these screens are too small to permit the solid portions of the materials to pass, the liquid portions are expelled and make their escape. They pass downwardly through the spaces 37 (see Fig. 2) and also between the ribs 25, being led through the slots 36 and making their escape through the outlet pipe 37. I find in practice that the pressure of the steam tends to render the mass very compact in the lower receptacle. Upon this account after once filling the apparatus, and applying the steam pressure, I cut off the steam supply, open the valve 8 and refill the upper receptacle. The oils and liquids associated therewith being pretty well removed from the entire mass, I next open the door 31, which is done by loosening the supporting bolts 43 and swinging the door upon the pivot 30, the roller 33 of the caster 32 merely following the track 34, as indicated in Fig. 2. In opening the door 31 the solid content of the lower receptacle is ejected, and this step is facilitated by the conical shape of the lower receptacle. If it be desired to eject the entire contents of both receptacles, this is accomplished by opening the two valve gates and the door 31, and if necessary applying more or less pressure by aid of the pipe 10. If it be desired to eject the contents of the lower receptacle only, the valve gates are closed by aid of the hand wheels 20, and afterward the door 31 is swung open as above described. It sometimes happens that in the lower portion of the upper receptacle, the solid material becomes compacted or wedged together, and is not easily dislodged. This may be remedied by closing the valve gates and admitting, by aid of the hand valve 39, a little steam through the pipe 38. This steam finding its way upward through the mass disturbs and loosens the latter so that the contents of the upper receptacle may now be readily dislodged. If, for any reason, it be desired to admit steam pressure directly into the lower receptacle, or to cause the steam to pass upwardly through the neck connecting the two receptacles, this is accomplished by aid of the pipe 40 and hand valve 41.

I do not limit myself to any particular raw material to be operated upon by this apparatus, nor to any particular aeriform body to be used in connection with it. Neither do I limit myself to the exact construction shown, the scope of my invention being commensurate with my claims.

Having thus described my invention, I claim as new and desire to secure by Letters Patent:

1. The combination of a receptacle having substantially the general form of a cone frustum, a screen mounted within said receptacle and also having substantially the form of a cone frustum, spacing rods disposed intermediate said screen and said receptacle, and extending uninterruptingly from the top to the bottom thereof, means for admitting an aeriform body under pressure into said receptacle for the purpose of forcing materials against said screen, a door connected with said receptacle and having generally a concave form, and a plurality of ribs mounted upon said door, and means for preventing the ingress of said materials intermediate said ribs.

2. The combination of a receptacle, a door therefor, ribs mounted upon said door, said ribs being provided with openings for the purpose of facilitating the collection of liquid materials lodging intermediate said ribs, a screen covering said ribs, and means for applying pressure of an aeriform body to materials disposed within said receptacle.

3. The combination of a receptacle, a door journaled relatively thereto, a roller for supporting said door, a plurality of ribs mounted upon said door, and a screen mounted upon said ribs and adapted to be brought into registry with said receptacle.

4. The combination of an upper receptacle, means for supporting the same, a lower receptacle, a neck connecting said lower receptacle with said upper receptacle, and thereby supporting said lower receptacle, a door journaled relatively to said lower receptacle, a roller for supporting said door, a plurality of ribs mounted upon said door and spaced apart, said ribs being provided with openings for facilitating the collection of liquid materials lodging intermediate said ribs, a screen resting upon said ribs, and means for applying pressure of an aeriform body to materials resting upon said screen.

In testimony whereof I have signed my name to this specification in the presence of two subscribing witnesses.

ALBERT J. MORLOCK.

Witnesses:
  WALTON HARRISON,
  JOHN P. DAVIS.